Oct. 21, 1930.   J. H. DAVIS   1,778,888
COMMUNION SERVICE
Filed Dec. 23, 1927

Inventor
*James H. Davis*
By
Attorney

Patented Oct. 21, 1930

1,778,888

UNITED STATES PATENT OFFICE

JAMES H. DAVIS, OF BIRMINGHAM, ALABAMA

COMMUNION SERVICE

Application filed December 23, 1927. Serial No. 242,133.

My invention relates to filling apparatus, and has for its object the provision of apparatus of the character designated by means of which a plurality of liquid containers may be expeditiously and simultaneously filled.

A more particular object of my invention is to provide, in association with a service tray having means for holding a plurality of similarly placed groups of communion cups in predetermined position and a filling device having spouts adapted to register with one group of the cups on the tray when properly positioned, a means for automatically positioning the tray for all the cups of a group to be filled simultaneously.

An individual communion service embodying a circular tray having a plurality of concentric series of openings therein for the reception of cups, has come into wide use. In order to avoid filling the cups one at a time, a filling device is provided, said filling device usually comprising a pivoted trough having a plurality of discharge conduits on one side which, when the tray is properly positioned with respect to the trough, are adapted to discharge into half the cups on the tray. In order to fill the other half of the cups, it is necessary to turn the tray through an angle of 180°, or half around, to bring the other half of the cups into proper position with respect to the discharge conduits. In positioning the tray with respect to the conduits, it must either be done by guess work, or a datum line must be marked on the tray and its support to indicate when the tray is in proper position for the conduits to be discharged into the cups. With either method, the results are sometimes unsatisfactory and the wine is spilled to one side of the cups instead of emptied into the cups. In order to overcome these difficulties, I provide a rotatable support for the tray and upon which the tray has a definite position. Means are provided for limiting rotation of the support to an angle of 180° and when the support is at either limit of its rotation, half the cups on the tray are in position to be filled from the discharge conduits.

Figure 1:
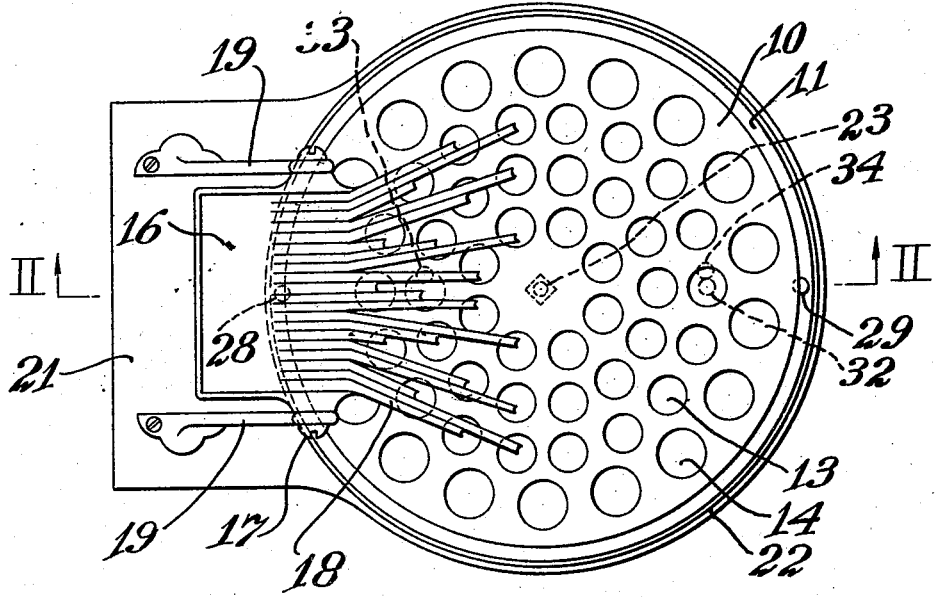
Figure 2:
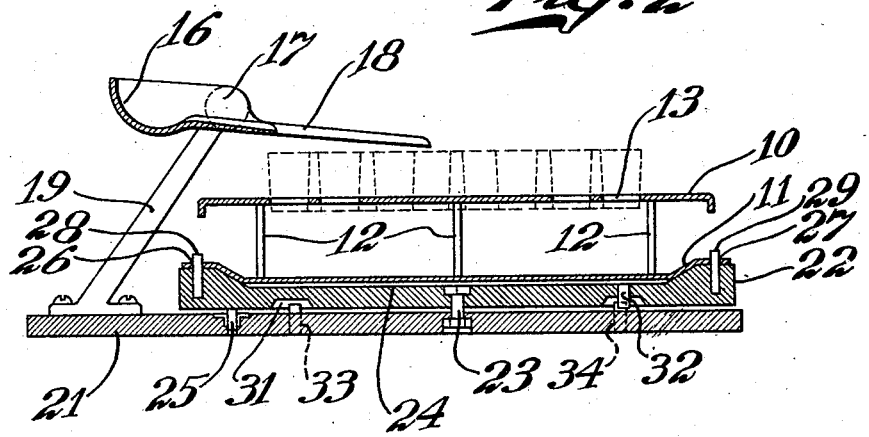

Apparatus embodying features of my invention is illustrated in the accompanying drawing, forming a part of this application, wherein Fig. 1 is a plan view of the device, and
Fig. 2 is a sectional view taken along the line II—II of Fig. 1.

Referring now to the drawing for a better understanding of my invention, I show a tray having an upper portion 10 and a lower portion 11 with a plurality of posts 12 separating the two portions. The upper portion 10 is provided with a plurality of series of spaced, concentric openings 13 to hold the cups to be filled and a single series of openings 14, larger in diameter than the openings 13, and adapted to receive the cups after they are emptied. It will be seen, with such an arrangement, the group of cups on one side of a diametral line of the tray are similarly arranged to the group of cups on the opposite side thereof. It will furthermore be appreciated, from a further reading of this application, that the arrangement of the cups may be widely varied so long as they are in a plurality of similar groups. In order to expeditiously fill the cups, there is provided a filling device comprising a trough 16 pivoted at 17 and provided with a plurality of discharge conduits 18, so arranged that when the tray 10 is properly positioned and the trough 16 tilted, the conduits 18 empty into the cups.

In order to bring about the proper positioning of the tray, automatically, I support the pivoted connection 17 from a pair of arms 19 mounted on a base 21. Also mounted on the base 21 is a turn-table 22 provided with an axle 23 journalled in the base 21 and having a central depression 24 to receive the lower portion 11 of the tray 10. If desired, a suitable number of roller bearings 25 may be provided between the base 21 and turn-table 22. The lower portion 11 of the tray is provided with two diametrically opposed holes 26 and 27, into which diametrically opposed pins 28 and 29 fit, the pins 28 and 29 being carried by the turn-table 22 and serving to establish a predetermined relative position of the tray to the turn-table 22 when filling the cups.

Provided on the underside of the turntable 22 is an annular groove 31 and carried by the turn-table 22 is a pin 32 projecting into the groove. Projecting upwardly into the groove 31 from the base 21 and in the path of rotation of the pin 32, are two stop pins 33 and 34. The pins 33 and 34 are arranged on opposite sides of the base 21 and sufficiently to one side of a diametral line through the base that when engaged by the pin 32 the arc of rotation of the turn-table 22 is limited to 180°.

From the foregoing description, the operation of my improved device will be apparent. The communion cups are first placed in the openings 13 and the tray 10 is placed on the turn-table 22 with the pins 28 and 29 extending through the holes 26 and 27. The turn-table 22 is then rotated until the pin 32 is against either the stop pin 33 or the stop pin 34, when the tray 10 is in position for the discharge conduits 18 to empty into the cups on half the tray. When the cups on that side have been filled, the tray is rotated in an opposite direction until the pin 32 engages the other stop pin, whereupon the cups on the other half of the tray are in position to be filled.

From the foregoing it will be apparent that I have devised an improved filling means of the character described whereby the cups of a communion service may be expeditiously filled and whereby the groups of cups may be readily positioned for filling.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a communion service, the combination of a tray having a plurality of openings for cups to be filled and similarly arranged on opposite sides of a center line therethrough, a rotatable support for the tray, means for mounting the tray on the support and in a predetermined relation thereto, a base for the rotatable support, a filling device carried by the base and having a plurality of conduits adapted to discharge into the cups to be filled on one side of the tray when said tray is brought into proper relative position thereto, a pair of stop pins mounted in the base, and a pin mounted at the underside of the rotatable support and positioned to engage the stop pins and limit the arc of rotation of the rotatable support whereby when engaged the conduits are in proper relative position to discharge into the cups.

2. In a communion service, the combination of a tray having a plurality of openings for cups to be filled and similarly arranged on opposite sides of a center line therethrough, a rotatable support for the tray, means for mounting the tray on the support and in a predetermined relation thereto, a base for the rotatable support, a filling device carried by the base and having a plurality of conduits adapted to discharge into the cups to be filled on one side of the tray when said tray is brought into proper relative position thereto, a pair of stop pins mounted in the base, and a pin mounted at the underside of the rotatable support and positioned to engage the stop pins and limit the arc of rotation of the rotatable support whereby when engaged the conduits are in proper relative position to discharge into the cups, said stop pins being arranged on opposite sides of the base and sufficiently to one side of a diametral line therethrough to limit the arc of rotation of the turntable to 180°.

In testimony whereof I, JAMES H. DAVIS, affix my signature.

JAMES H. DAVIS.